US007249322B2

(12) United States Patent
Jones et al.

(10) Patent No.: US 7,249,322 B2
(45) Date of Patent: Jul. 24, 2007

(54) E² AUTOMOBILE DEALERSHIP INFORMATION MANAGEMENT SYSTEM

(75) Inventors: Kathryn A Jones, Miamisburg, OH (US); Patrick H Caruso, Springboro, OH (US); Dorothy B Thompson, Centerville, OH (US); Mark A Guisinger, Enon, OH (US); Christopher M Scott, Beavercreek, OH (US); Lawrence J Deters, Dayton, OH (US); Parrish Hanna, Libertyville, IL (US); Steven P. Gaeke, Miamisburg, OH (US); James C Adkins, Dayton, OH (US); Macarthur Kammeron, Hamilton, OH (US); Michael S Gokey, Miamisburg, OH (US); Wiilliam E Jamison, Centerville, OH (US); Edward J Wasser, Dayton, OH (US); Paul J. Militello, Centerville, OH (US)

(73) Assignee: Reynolds and Reynolds Holdings, Inc., Dayton, OH (US)

( * ) Notice: Subject to any disclaimer, the term of this patent is extended or adjusted under 35 U.S.C. 154(b) by 850 days.

(21) Appl. No.: 09/785,462

(22) Filed: Feb. 20, 2001

(65) Prior Publication Data
US 2002/0024537 A1    Feb. 28, 2002

Related U.S. Application Data

(60) Provisional application No. 60/210,905, filed on Jun. 12, 2000.

(51) Int. Cl.
G06F 3/048        (2006.01)
G06F 17/00       (2006.01)
(52) U.S. Cl. .............. 715/751; 715/779; 715/854; 715/962; 705/38; 705/9; 705/7

(58) Field of Classification Search ........... 715/854, 715/738, 739, 962, 779, 781, 804, 751, 759, 715/733, 744, 745, 747, 808, 809; 705/1, 705/69, 73, 80, 11, 9, 8, 7, 14, 20, 29, 28, 705/35, 38
See application file for complete search history.

(56) References Cited

U.S. PATENT DOCUMENTS 4,989,141 A    1/1991    Lyons et al. ............ 364/408

(Continued)

OTHER PUBLICATIONS

U.S. Appl. No. 60/230,274, filed Sep. 6, 2000.*

(Continued)

Primary Examiner—Raymond J. Bayerl
(74) Attorney, Agent, or Firm—Stephen C. Glazier; Kirkpatrick & Lockhart

(57) ABSTRACT

The present invention provides for the first time, an integrated software application architecture with all functions required by an automobile dealership, including sales, F&I (finance and insurance), accounting, HR (Human Resources)/payroll, parts, service, and E² core (including functions in customer management, vehicle management, activity/processors, roles, user/departments, security, user interface, reports, printing, and instant messaging), together with e-business enablers, supply chain integration, and a dealer communication system. The present invention also provides relational databases, GUI's (graphical user interfaces, that is, browser based application program interfaces). The present invention also may be implemented by an operations center with a Microsoft Windows NT server providing local Ethernet or other electronic connections to several multiple remote stores for the operator, and is scalable.

12 Claims, 11 Drawing Sheets

U.S. PATENT DOCUMENTS

| | | | |
|---|---|---|---|
| 5,319,544 A | 6/1994 | Schmerer et al. | 364/403 |
| 5,663,746 A | 9/1997 | Pellenberg et al. | 345/113 |
| 5,774,883 A | 6/1998 | Andersen et al. | 705/38 |
| 5,778,178 A | 7/1998 | Arunachalam | 395/200.33 |
| 5,794,206 A | 8/1998 | Wilkinson et al. | 705/1 |
| 5,953,707 A | 9/1999 | Huang et al. | 705/10 |
| 5,974,395 A | 10/1999 | Bellini et al. | 705/9 |
| 5,987,500 A | 11/1999 | Arunachalam | 709/203 |
| 6,052,631 A * | 4/2000 | Busch et al. | 701/29 |
| 6,449,597 B1 * | 9/2002 | McGill | 705/1 |
| 6,609,050 B2 * | 8/2003 | Li | 705/11 X |
| 2001/0053983 A1 * | 12/2001 | Reichwein et al. | 705/1 |
| 2002/0052778 A1 * | 5/2002 | Murphy et al. | 705/14 |
| 2002/0091706 A1 * | 7/2002 | Anderson et al. | 705/1 X |
| 2002/0091764 A1 * | 7/2002 | Yale | 345/745 X |
| 2002/0107833 A1 * | 8/2002 | Kerkinni | 707/1 |
| 2002/0123961 A1 * | 9/2002 | Stoyanov et al. | 705/38 |

OTHER PUBLICATIONS

U.S. Appl. No. 60/264,595, filed Jan. 25, 2001.*
U.S. Appl. No. 60/264,646, filed Jan. 25, 2001.*

* cited by examiner

FIG. 5(a)

Borcherding Enterprise | Deal Deal #: 1449 | Guests | Primary Vehicle Stock #: Y1196717 2001 Buick | Trade

Calculate Payments -- Web Page Dialog

Term [Preferred ▼]  Credit Score [630]  Lenders [Preferred ▼]  Mileage [ ]

Previously Selected Payment:

| | Monthly Payment | Term | Lender Name | Selling Rate | APR | Res. % | Res. Amt. | Front End Gross | Back End Gross | Total Deal Gross | Initial Payment |
|---|---|---|---|---|---|---|---|---|---|---|---|
| 24 | 798.40 | 24 | Huntington, Cincinnati | 10.99 | 11.70 | 0 | $0.00 | $24,775.00 | $430.68 | $25,205.68 | $10,000.00 |
| | 799.23 | 24 | GMAC, Cincinnati | 11.49 | 12.03 | 0 | $0.00 | $24,775.00 | $429.97 | $25,204.97 | $10,000.00 |
| | 799.52 | 24 | Bank One, Cincinnati | 11.35 | 12.06 | 0 | $0.00 | $24,775.00 | $430.00 | $25,205.00 | $10,000.00 |
| | 800.35 | 24 | Chase, Lisle | 11.48 | 12.19 | 0 | $0.00 | $24,775.00 | $362.55 | $25,137.55 | $10,000.00 |
| 36 | $555.18 | 36 | Firstar, Cincinnati | 10.04 | 10.37 | 0 | $0.00 | $24,775.00 | $482.95 | $25,257.95 | $10,000.00 |
| | $564.24 | 36 | Huntington, Cincinnati | 10.99 | 11.48 | 0 | $0.00 | $24,775.00 | $485.16 | $25,260.16 | $10,000.00 |
| | $565.97 | 36 | Bank One, Cincinnati | 11.35 | 11.84 | 0 | $0.00 | $24,775.00 | $484.82 | $25,259.82 | $10,000.00 |
| | $566.14 | 36 | GMAC, Cincinnati | 11.49 | 11.86 | 0 | $0.00 | $24,775.00 | $484.86 | $25,259.86 | $10,000.00 |
| 48 | $439.33 | 48 | Firstar, Cincinnati | 10.04 | 10.29 | 0 | $0.00 | $24,775.00 | $541.70 | $25,316.70 | $10,000.00 |
| | $448.44 | 48 | Huntington, Cincinnati | 10.99 | 11.37 | 0 | $0.00 | $24,775.00 | $545.78 | $25,320.78 | $10,000.00 |
| | $450.56 | 48 | Bank One, Cincinnati | 11.35 | 11.73 | 0 | $0.00 | $24,775.00 | $545.97 | $25,320.97 | $10,000.00 |
| | $450.97 | 48 | GMAC, Cincinnati | 11.49 | 11.78 | 0 | $0.00 | $24,775.00 | $546.16 | $25,321.16 | $10,000.00 |
| 60 | $370.76 | 60 | Firstar, Cincinnati | 10.04 | 10.25 | 0 | $0.00 | $24,775.00 | $606.41 | $25,381.41 | $10,000.00 |
| | $380.06 | 60 | Huntington, Cincinnati | 10.99 | 11.30 | 0 | $0.00 | $24,775.00 | $613.02 | $25,388.02 | $10,000.00 |
| | $382.46 | 60 | Bank One, Cincinnati | 11.35 | 11.66 | 0 | $0.00 | $24,775.00 | $613.97 | $25,388.97 | $10,000.00 |
| | $383.04 | 60 | GMAC, Cincinnati | 11.49 | 11.72 | 0 | $0.00 | $24,775.00 | $614.40 | $25,389.40 | $10,000.00 |

Calculate Payments | View Exceptions | Select | Cancel

Logoff Wheeler R | Save | Calculate Payments | Print Forms | Deal Notes | Hide | Residual Equipment | Cancel

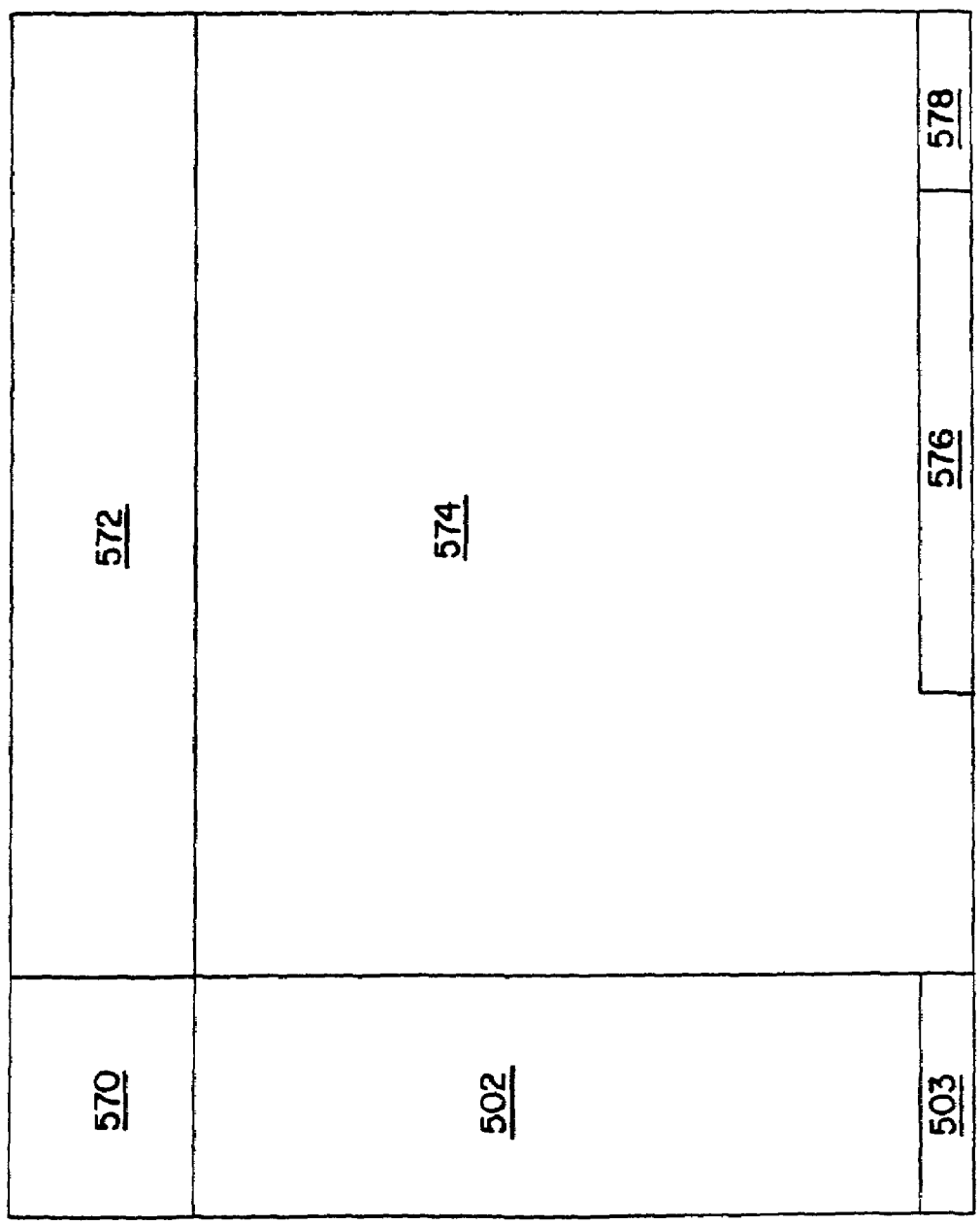

Shop Capacity

Date: 04/25/2000　　Make: All　　VehicleType: 　　Dispatcher: All　　Department: All

Buick

| Category | Est.Time | Total | Pre-Sold | UnSold Hours | Sold Jobs | Sold Hours |
|---|---|---|---|---|---|---|
| ACCESSORIES(Car) | 0.63 | 43.72 | 0 | 33.21 | 1 | 0.1 |
| Air bag restraint system(Car) | 1.32 | 43.72 | 0 | 33.21 | 0 | 0 |
| Air conditioning & heater(Car) | 1.26 | 43.72 | 0 | 33.21 | 0 | 0 |
| Alternator(Car) | 0.7 | 43.72 | 0 | 33.21 | 0 | 0 |
| Anti-lock brake system(Car) | 1.67 | 43.72 | 0 | 33.21 | 0 | 0 |
| Auto trans hydra-matic 4l60e(Car) | 2.75 | 43.72 | 0 | 33.21 | 0 | 0 |
| Auto trans[hydra-matic 4l30a](Car) | 3.05 | 43.72 | 0 | 33.21 | 0 | 0 |
| Auto trans[hydra-matic 4l60e](Car) | 2.75 | 43.72 | 0 | 33.21 | 0 | 0 |
| Automatic trans controls(Car) | 0.5 | 43.72 | 0 | 33.21 | 0 | 0 |
| Automatic transaxle(Car) | 4.56 | 43.72 | 0 | 33.21 | 0 | 0 |

Pontiac

| Category | Est.Time | Total | Pre-Sold | UnSold Hours | Sold Jobs | Sold Hours |
|---|---|---|---|---|---|---|
| ACCESSORIES(Car) | 0.7 | 43.72 | 0 | 33.21 | 0 | 0 |
| ACCESSORIES(Van) | 0.7 | 10.72 | 0 | 0.21 | 0 | 0 |
| Air bag restraint system(Car) | 1 | 43.72 | 0 | 33.21 | 0 | 0 |
| Air bag restraint system(Van) | 1 | 10.72 | 0 | 0.21 | 0 | 0 |
| Air conditioning & heater(Car) | 1 | 43.72 | 0 | 33.21 | 0 | 0 |
| Air conditioning & heater(Van) | 1 | 10.72 | 0 | 0.21 | 0 | 0 |
| Alternative fuel [B+FUEL]j(Car) | 0.61 | 43.72 | 0 | 33.21 | 0 | 0 |
| Alternator(Car) | 0.84 | 43.72 | 0 | 33.21 | 0 | 0 |
| Alternator(Van) | 0.84 | 10.72 | 0 | 0.21 | 0 | 0 |
| Auto trans hydra-matic 4l60e(Car) | 2.32 | 43.72 | 0 | 33.21 | 0 | 0 |

ComputeSC

FIG. 6(c)

E² AUTOMOBILE DEALERSHIP INFORMATION MANAGEMENT SYSTEM

This application claims the benefit of U.S. Provisional Application No. 60/210,905, filed on Jun. 12, 2000, incorporated herein in its entirety by reference.

FIELD OF THE INVENTION

The field of the present invention is information management systems. More specifically, the present invention deals with enterprise-wide information management systems for automobile dealerships.

BACKGROUND OF THE INVENTION

Information systems have been developed for automobile dealerships in the past. Traditionally, in these systems, different functions are provided by distinct software applications with distinct databases. The databases have limited integration. Also, the rapid evolution of computer hardware and software infrastructures have left these legacy computer systems with inferior capabilities. For example, many such legacy systems have flat file structures, Unix-based systems, are not object oriented, and do not have browser based application program interfaces (APIs).

SUMMARY OF THE PRESENT INVENTION

Therefore, it is an object of the present invention to provide an information management system for automobile dealerships that provides complete integrated functionality of all software program applications for a dealer, in an integrated single database, which covers multiple dealership locations for a single operator, and which operates on a state-of-the-art hardware and software infrastructure, including relational databases, object oriented software, browser base web APIs, and other advances.

The present invention provides, an integrated software application architecture with all functions required by an automobile dealership, including sales, F&I (finance and insurance), accounting, HR (Human Resources)/payroll, parts, service, and E² core (including functions in customer management, vehicle management, activity/processors, roles, user/departments, security, user interface, reports, printing, and instant messaging), together with e-business enablers, supply chain integration, and a dealer communication system. The present invention also provides relational databases, GUI's (graphical user interfaces, that is, browser based application program interfaces). The present invention also may be implemented by an operations center with a Microsoft Windows NT server providing local Ethernet or other electronic connections to several multiple remote stores for the operator, and is scalable.

BRIEF DESCRIPTION OF THE DRAWINGS

FIG. 5a shows a more specific example of a GUI according to the present invention, displaying collected sales financing information.

FIG. 5b shows a more specific example of a GUI according to the present invention, displaying collected lease financing information.

FIG. 6a shows an example of a GUI according to the present invention, displaying vehicle service information.

FIG. 6b is a schematic representation of the vehicle service information GUI. FIG. 6c shows an example of another GUI according to the present invention, displaying vehicle service information.

DETAILED DESCRIPTION OF THE PREFERRED EMBODIMENTS

Figure 1:
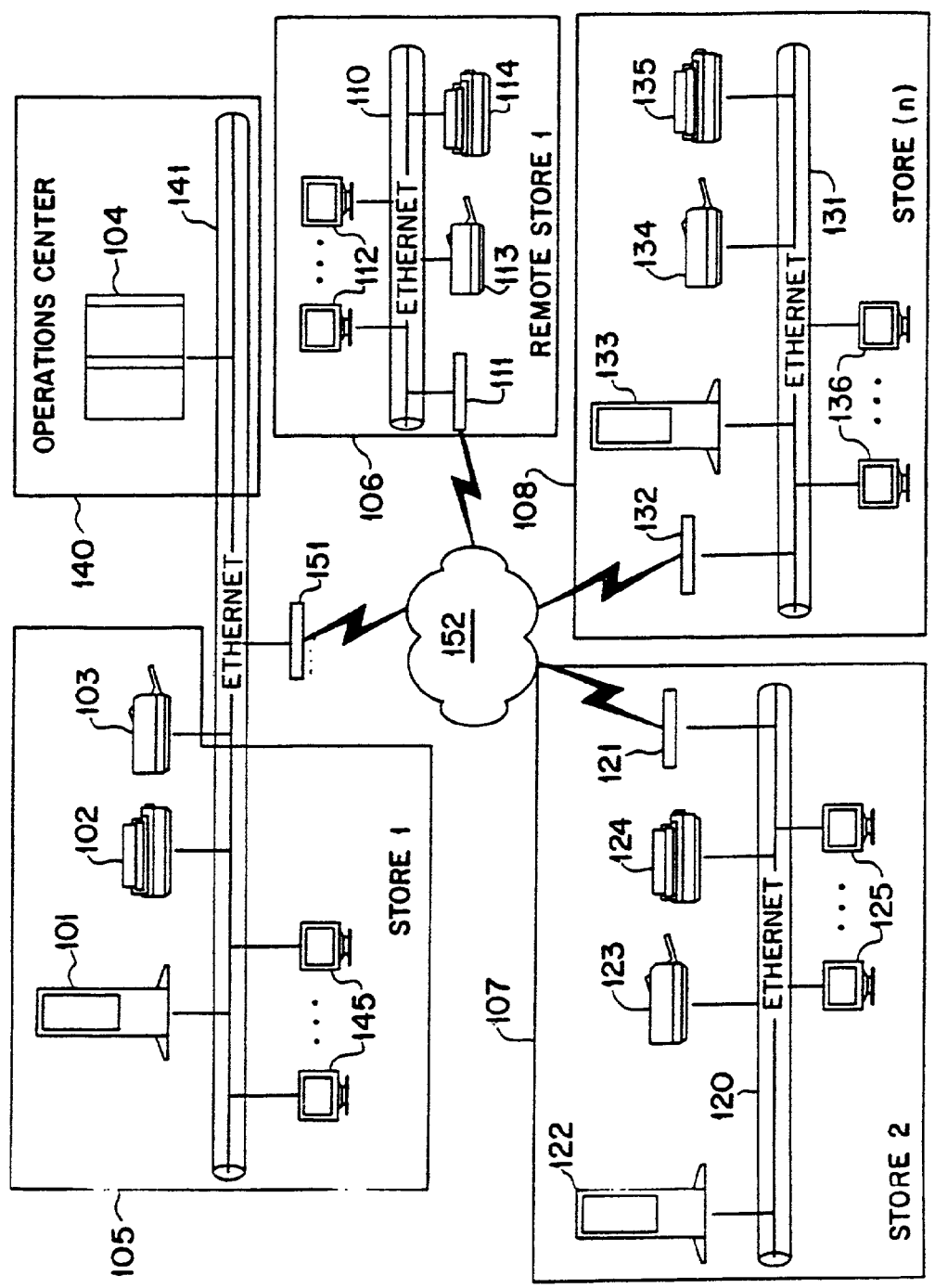
FIG. 1 shows a preferred embodiment of the hardware infrastructure of the present invention.

FIG. 1 shows a preferred embodiment of the hardware infrastructure for the present invention. An operation center 140 may contain an operations server 104, which may be, for example, a Microsoft Windows NT server 4.0, or Windows 2000 server, with an SQL (Structured Query Language) 7.0 server. Preferably, the operation server may be an HP (Hewlett Packard) LH 6000.

The operations server 104 may communicate through a local Ethernet 141 to a local store 105. Local Store 105 may use a store processor 101 which may be, for example, an HP LC 2000 (600 MHz) which is preferably running NT 4.0, or Windows 2000 and the following Microsoft products, IIS 4.0, MTS 2.0 and MSMQ 1.0 and may support 25 users or more. This may be connected through an Ethernet 141, or otherwise to any number of peripherals including preferably such devices as a dot-matrix printer 102 or a laser printer 103. A series of workstations 145 are preferably provided for accessing the store processor 101.

The important difference between operations server 104 and the other servers, such as store processor 101, is the SQL server function of the operations server 104. All database queries are processed by this server 104, leaving the other servers such as store processor 101 to handle, for example, any Internet queries. The server 104 is thus handling the database operations. The store servers such as store processor 101 may act to support 2-3 stores.

In addition to the local store 105, there may be provided connections to a plurality of stores 106, 107 and 108 which are not on the same Ethernet 141 as store 105 and the operation center 140. The connections as shown consist of high bandwidth WAN (Wide Area Network) connections which connect centrally to a virtual private network (VPN), which may be on the Internet, or leased lines 152 (for example, DSL, T1, or any other leased line solution, or other telecommunications link). In turn, the virtual private network 152 connects to the local Ethernet 141. Each physical location preferably has a router 111, 121, 132, 151 which facilitates communications throughout the network.

As noted above, one or more local stores at 105 may be at the same physical location as the servers 101 and 104. Additionally, one or more remote stores 106 may be configured with an Ethernet LAN 110 communicating with the operations center server 104 through the store router 111.

Remote store 106 may contain a plurality of PC workstations 112, laser printers 113 and dot-matrix printers 114, with no local server.

An alternative configuration for a remote store 107 may have a Ethernet LAN 120 communicating with the server 104 through the VPN and router 121.

As with store 105, the alternative remote store 107 may preferably include a server 122 which may be an NT server 4.0, or Windows 2000 server, with IIS 4.0 MTS 2.0, MSMQ 1.0 for 25 users or more. This store 2 processor 122 may be an HP LC 2000 (600 mHz). This store 2 processor 122, may communicate through its local Ethernet LAN 120 with a plurality of laser printers 123, dot-matrix printers 124 and workstations 125.

There may be any number of further remote stores 108 each configured with a local Ethernet LAN 131, router 132, NT server 133, a plurality of laser printers 134, and a plurality of dot-matrix printers 135 or any other type of appropriate output device such as a facsimile machine or future technologies.

Remote store 106 is an embodiment of a store with no local server. In the this configuration, the workstations 112 communicate electronically, directly with one of the store servers 101, 122, or 133. There may be any number of stores 106 having this configuration.

Figure 2A:
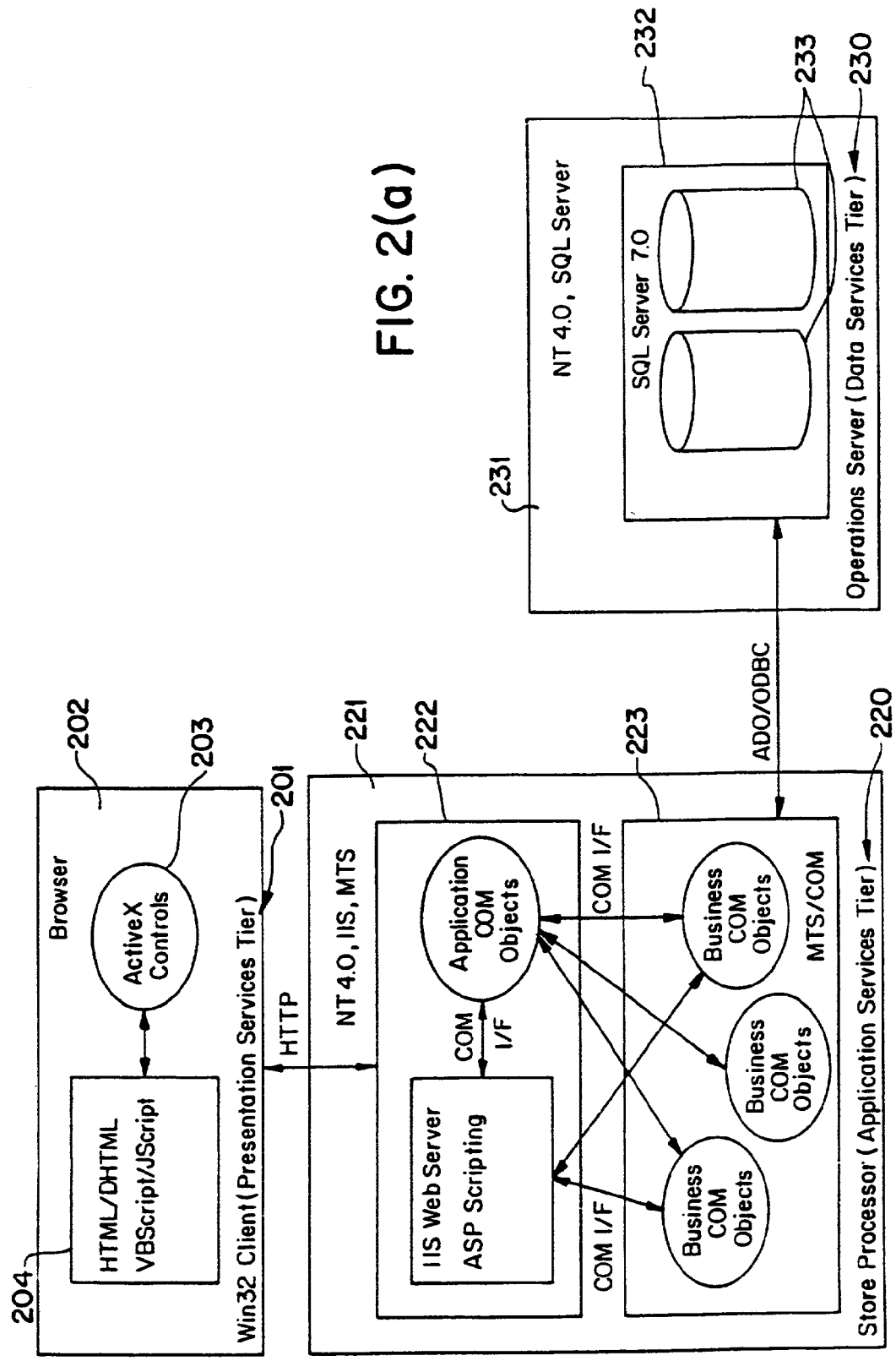
FIG. 2a shows one embodiment of the software architecture of the system.

FIG. 2a shows one embodiment of the software architecture of the system. Though all references are to Microsoft network products, this reflects a preferred embodiment and not a requirement that that company's software be used. Thus, any equivalent or similar networking products and protocols may be used provided that they accommodate the called for transfers of requests and data. At the users' workstations 145, 112, 125 and 136 there may be a WIN 32 client presentation services tier 201. This tier communicates electronically by an HTTP link to the store processor applications services tier 220. Tier 220 communicates electronically with an ADO/ODBC (Active Data Object/Open DataBase Connectivity) link to the operations server services tier 230.

The presentation services tier 201 resides in the client workstations 145, 125, 136, 112 at the stores 105, 106, 107, and 108.

The store processor applications services tier 202 resides in the store processors 101, 122, 133.

The operations server data services tier 203 in the preferred embodiment resides in the operations server 104.

The presentation services tier 201 contains a user interface layer which is preferably a browser such as IE 4.01 or IE 5.0 202. Preferably the client browser is compatible with Active X controls 203 and HTML/DHTML 204.

Figure 2B:
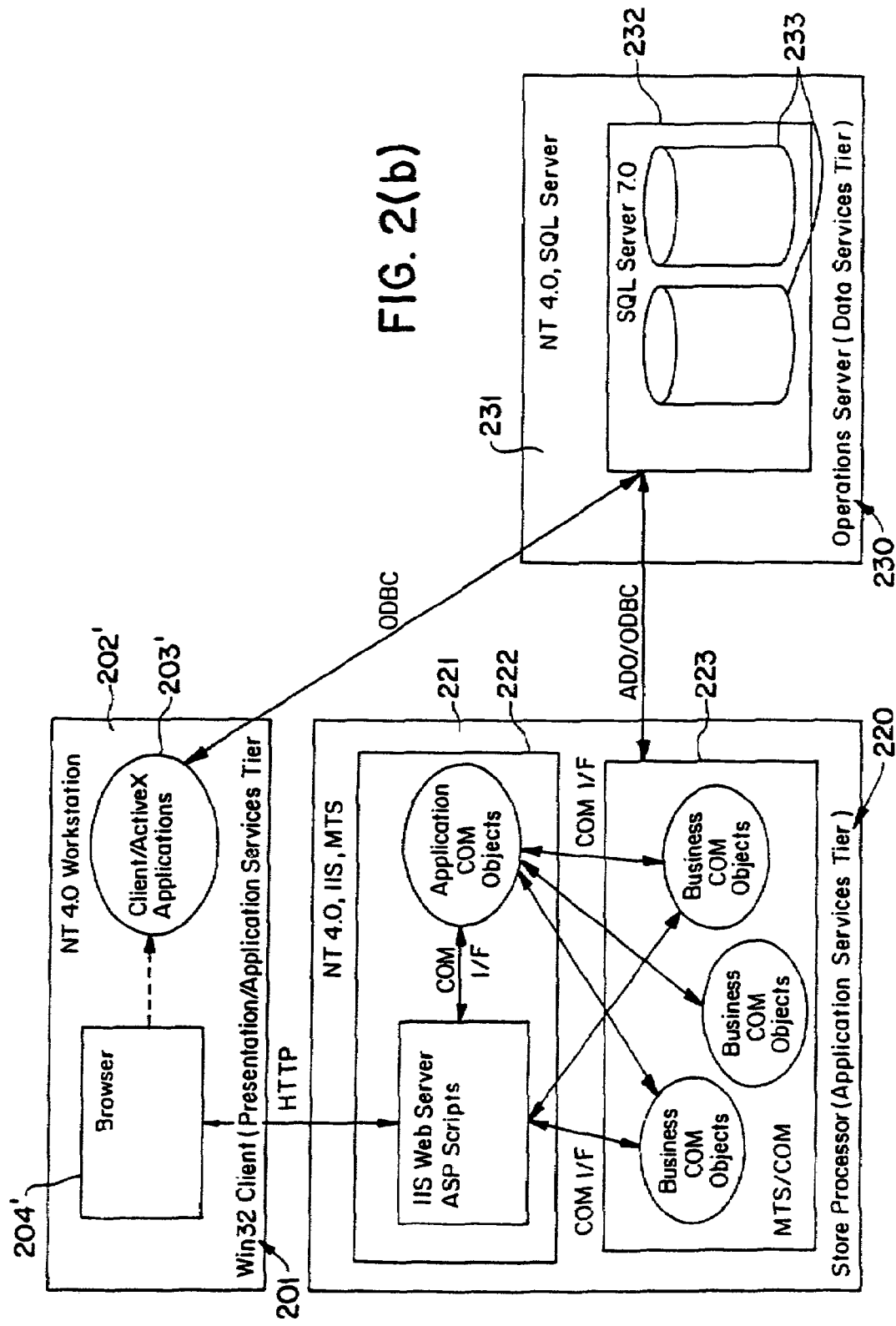
FIG. 2b shows an alternate software architecture of the system.

FIG. 2b shows an alternate software architecture of the system in which 202' is a presentation/application services tier rather than a presentation services tier as in FIG. 2a. To accommodate this, 203' includes client and active X applications. Finally, 204' represents browser software. Additionally, an ODBC connection is provided allowing the client and Active X applications 203 direct access to the data services tier 233.

The applications services tier 220 is an object oriented system and contains an infrastructure layer 221 which may be NT 4.0, IIS, MTS. Application services tier 220 contains an application layer 222 with ASP scripting application, COM objects, and IIS web server (IIS 4.0/ASP 2.0/COM). Layer 222 communicates using COM I/F with a domain layer 223 MTS 2.0/COM including multiple business COM objects.

The data services tier 230 would include an infrastructure layer 231 (NT 4.0 or Windows 2000, SQL 7.0 server 232. The SQL 7.0 server 232 would contain a plurality of databases 233 as needed.

The tiers work together to allow a user at a workstation 136 as shown in FIG. 1 to use a web browser such as Internet Explorer to access a database contained at a remote location. In terms of FIGS. 2(*a*) and (*b*), the user is interfacing with the SQL Server 233 via browser 202. The browser 202 communicates via HTTP with the application services tier 220 which is hosted at the store processor (101 in FIG. 1). IIS, in the application services tier 220 accepts HTTP queries and forwards them to COM objects that call the SQL server via ADO and/or ODBC which then supplies the replies to the queries. The SQL server returns the requested data objects which are used by the application services tier 220. The applications services tier 220 uses an HTTP file to communicate to the presentation services tier where information is formatted and displayed to the user at the workstation 145 where the user may view the data in a format such as those shown in FIGS. 5(*a*) and 6(*a*) and represented in FIGS. 5(*c*) and 6(*b*).

The Operations Center 140 may be operated by or for a single business entity with multiple stores 105, 106, 107, 108. Alternatively, the Operations Center 140 may be operated by a third party for a variety of multi-store, and single store entities, with segregated secure databases 233 for each such entity.

The term "store" is used in the automobile dealer industry to mean an individual automobile dealership location, which may include sales, service and parts departments, for example. A single dealer may operate several stores and the stores may represent several different manufacturers, or may include multiple stores representing a single manufacturer.

Figure 3:
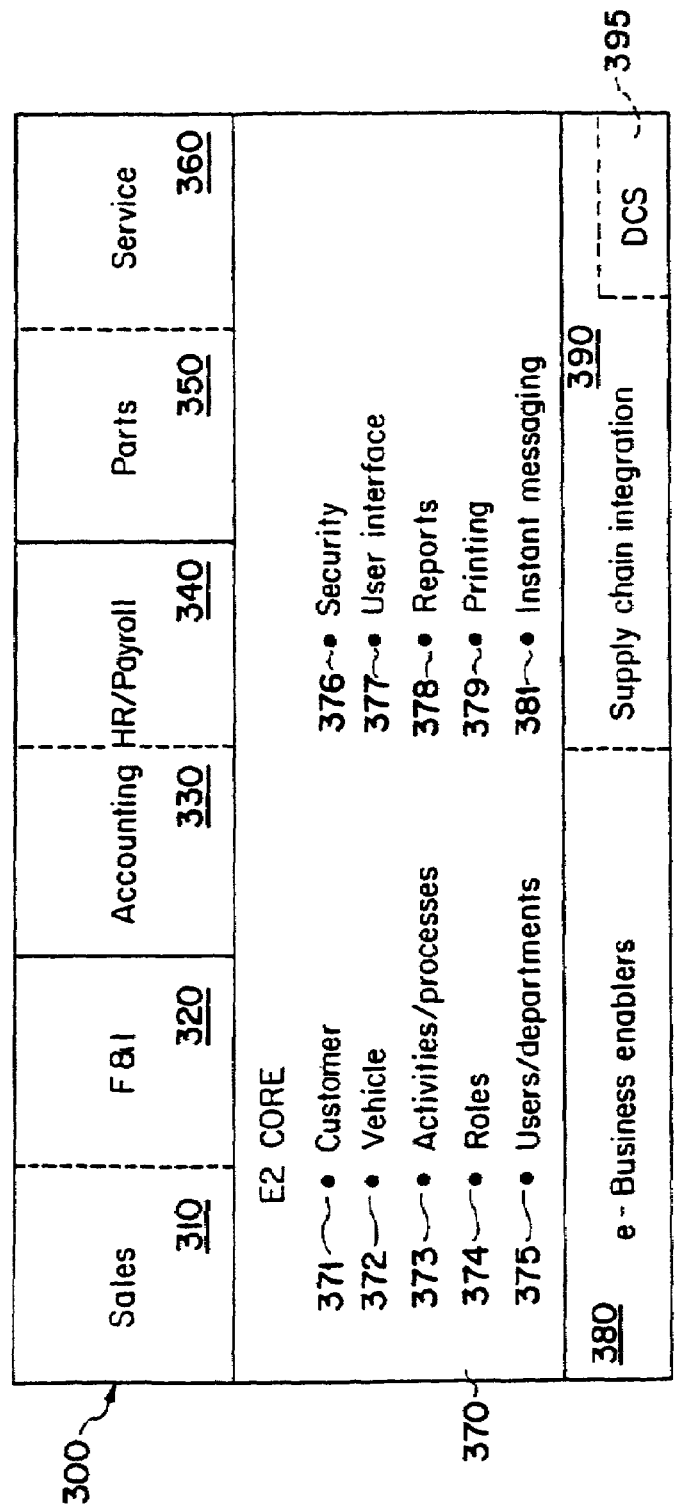
FIG. 3 shows the basic architecture of the software application of one embodiment of the present invention.

FIG. 3 shows the basic architecture of the software application 300 in one embodiment of the present invention. The enumerated applications are the various software applications which the user is able to remotely access via a browser as described above. They preferably include software applications for sales 310, F&I (financing and insurance) 320, accounting 330, H/R (Human Resources) 340, parts 350, service 360, the Reynolds & Reynolds $E^2$ proprietary core 370, e-business enablers 380, supply chains integration 390, and dealer communication system (DCS) 395.

The accounting application 330 may be provided by Sage Software, which may sell source code in this matter. The HR/Payroll application 340 may be provided by another third party software vendor.

The parts software application 350 may interface with electronic parts catalogs or labor time guides, provided for manufacturers. The electronic parts catalog and labor time guide may be used together by the parts of applications 350. The service software applications 360 may use the Service Price Guide.

The Reynolds & Reynolds Company $E^2$ Core 370 software application is being developed by The Reynolds & Reynolds Company and may include software applications for customer management 371, vehicle management 372, activity/processor 373, roles 374, user/departments 375, security 376, user interface 377, reports 378, printing 379, and instant messaging 381.

In a preferred embodiment the reports 378 may be generated using Crystal Reports from Seagate Software.

The $E^2$ Core 370 may provide some data from third party sources such as the Blue Book Used Car Prices.

The DCS dealer communication system 395 provides communications for the present invention between the automobile dealer and the automobile manufacturers that service that dealer.

The e-business enablers 380 may integrate other e-business applications either proprietary to The Reynolds & Reynolds Company or from third party vendors.

Possible future E-commerce applications 380 for various embodiments may include interface with Carpoint.com or another Internet web page that searches for cars requested and refers the user to dealers found that have the requested car. The e-business enablers 380 may also include an interface with a F&I website that searches for and selects the best F&I (Finance and Insurance) services. Additional e-business enablers may include interfacing with Internet public web pages that schedules service meetings between the service center and consumers over the Internet. Another e-commerce enabler may interface with an Internet application that sends out service reminders from a dealer to individual consumers or owners of automobiles serviced by the dealer. Another e-business enabler 380 that may be incorporated into an embodiment is an intra-dealer and inter-dealer parts inventory and sales systems. Another e-business 380 enabler that may be incorporated into an embodiment is an intra-dealer and inter-dealer car inventory search and ordering system.

Another function which may be incorporated in the $E^2$ Core 370 is an electronic time clock. This software would interface with a time clock system for each automobile service person. For each individual service person, this function collects the data (for a day or other period) for the total time that the individual was at the job site. It also collects and aggregates from the automobile service transaction records database, the time allocated to each service job for that individual. The software application then compares the time charged by the individual to specific service jobs (added for all service jobs), to the total time the individual was on the site, to develop day-by-day individual-by-individual productivity analysis for each individual service person.

Figure 4:
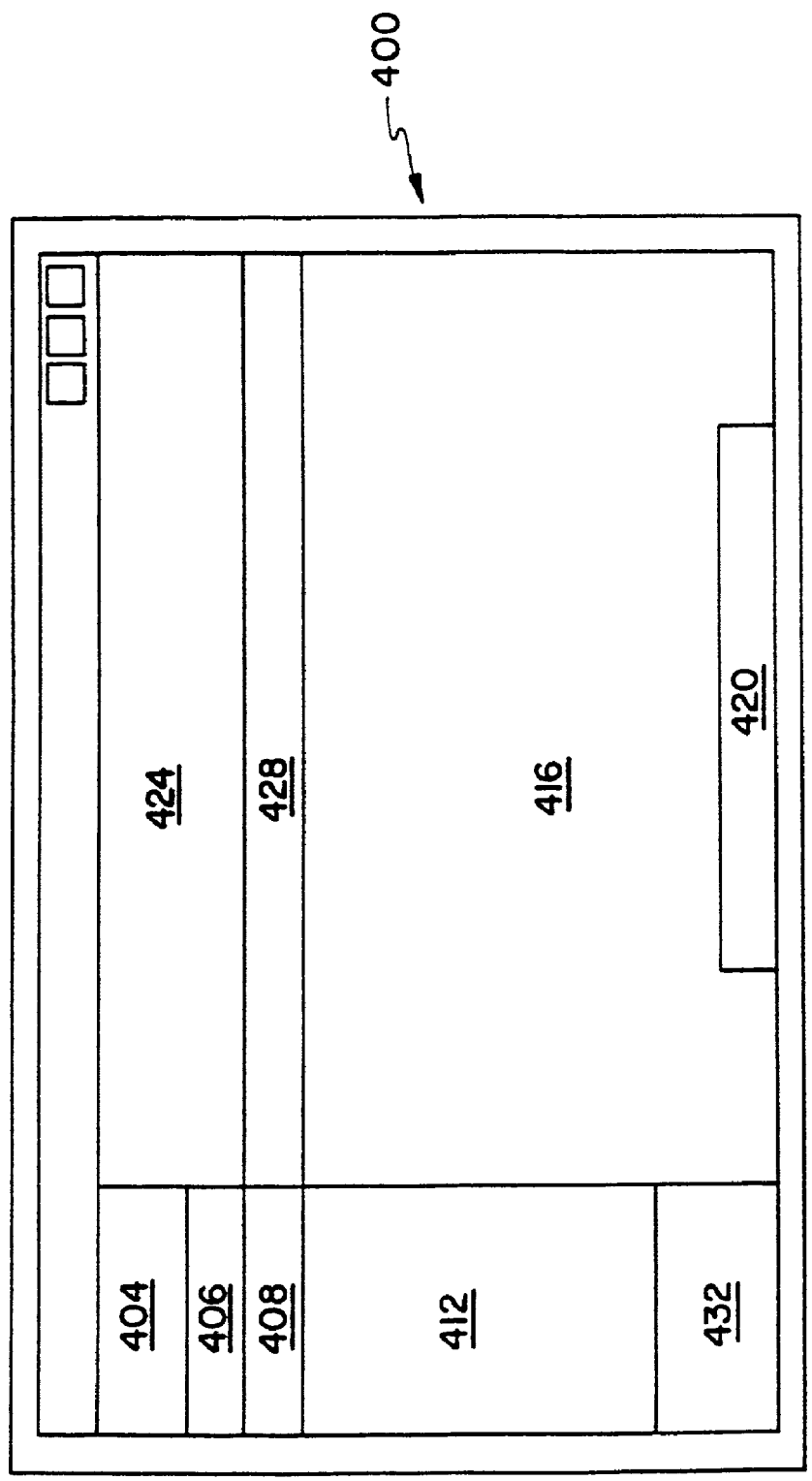
FIG. 4 shows an example of a GUI according to the present invention.

FIG. 4 shows an example of a generalized GUI or application screen 400 according to the present invention. The GUI 400 is preferably broken up into eight major regions as defined below. The GUI 400 is preferably consistent throughout the information management system, despite uses including different customers, different business lines, different user roles and different content.

A branding region 404 is preferably provided which can include branding information for the dealer or manufacturer. For example, this region may reflect that a Chevrolet dealership is operating the software, as shown in FIG. 6(*a*).

A list button or default page region 406 preferably contains a navigation aid which may, for example, be keyed to the user's native product line. By way of example, if a user is a service advisor, the list button could be a vehicle service information display, or a route sheet, as shown in FIG. 6(*a*).

An application drop-down list 408 provides a list of purchased applications the user may access, which may be restricted based on the user's security settings. For example, the user may be running the Client Management Application and need to use the application drop-down list 408 to switch to the service application to check on an appointment time for a customer.

A task bar 412 provides a list of selection items or processes which are preferably listed in an expandable format such as folders which may be opened to reveal additional choices. If the number of available selection items is large, the task bar preferably includes a scroll bar to allow access to each item.

A content region 416 is preferably provided which includes the content appropriate to the selected item or process from the task bar 412. The content region may contain data, charts, drawings, graphs, lists of varying length, forms, forms wizards, and sequenced data processes such as modifying or viewing data.

For interacting with the content region 416, action buttons 420 are preferably provided. The action buttons 420 allow a user to perform some action with the data displayed in the content region. The action buttons 420 may be keyed to the specific content displayed in the content region 416. For example, if client data is displayed in the content region 416, the action buttons 420 may include "replace", "add", and "delete" functions. It may be preferable that for certain content, no action buttons 420 are available. For example, when a form wizard for adding data is displayed, no action buttons 420 may be needed if the wizard only allows adding of data.

A variety of action buttons 420 may be available, including but not limited to: modify, delete, search, print preview, print, new object, add object, replace, next screen, previous screen, finish, save, restore, cancel, close, import a file, and export a file.

A context region 424 may be included. The context region 424 includes information about an entity or a component of the task domain in which the user is working. For example, in a service application, the context region 424 may include information on the customer, vehicle, contact information, service information and other information relevant to the particular task. The customer field preferably contains the customer's name, an identification number, contact information and preferred method of contact. The vehicle information preferably contains information such as the make and date, model, vehicle identification number, license number, mileage and other information as necessary. In the case that the information to be displayed in the context region is larger than the region size, scroll bars can be provided and an indicator such as an ellipsis may be displayed.

The context region 424 may be minimized to make more information visible in the content region 416, or may be maximized to better display the information in the context region 424.

Relationship buttons 428 may be provided to provide additional functions concerning the content region. For example, if the content region includes customer and vehicle information, the relationship buttons may be "History," "Recommended" and "Customer." For example, the "History" button would call up information on the previous work done for that particular vehicle. The "Customer" button could request information on the customer beyond what appears in the context region. The "Recommended" button might request information on the particular vehicle such as the recommended service given the current mileage. Other such relationship functions may be provided as appropriate or useful.

Preferably a user assistance region 432 is included which may include buttons for such functions as help, interactive help, log off or access to other tools. The log off button in the user assistance region 432 may display the user identification.

Figure 5B:
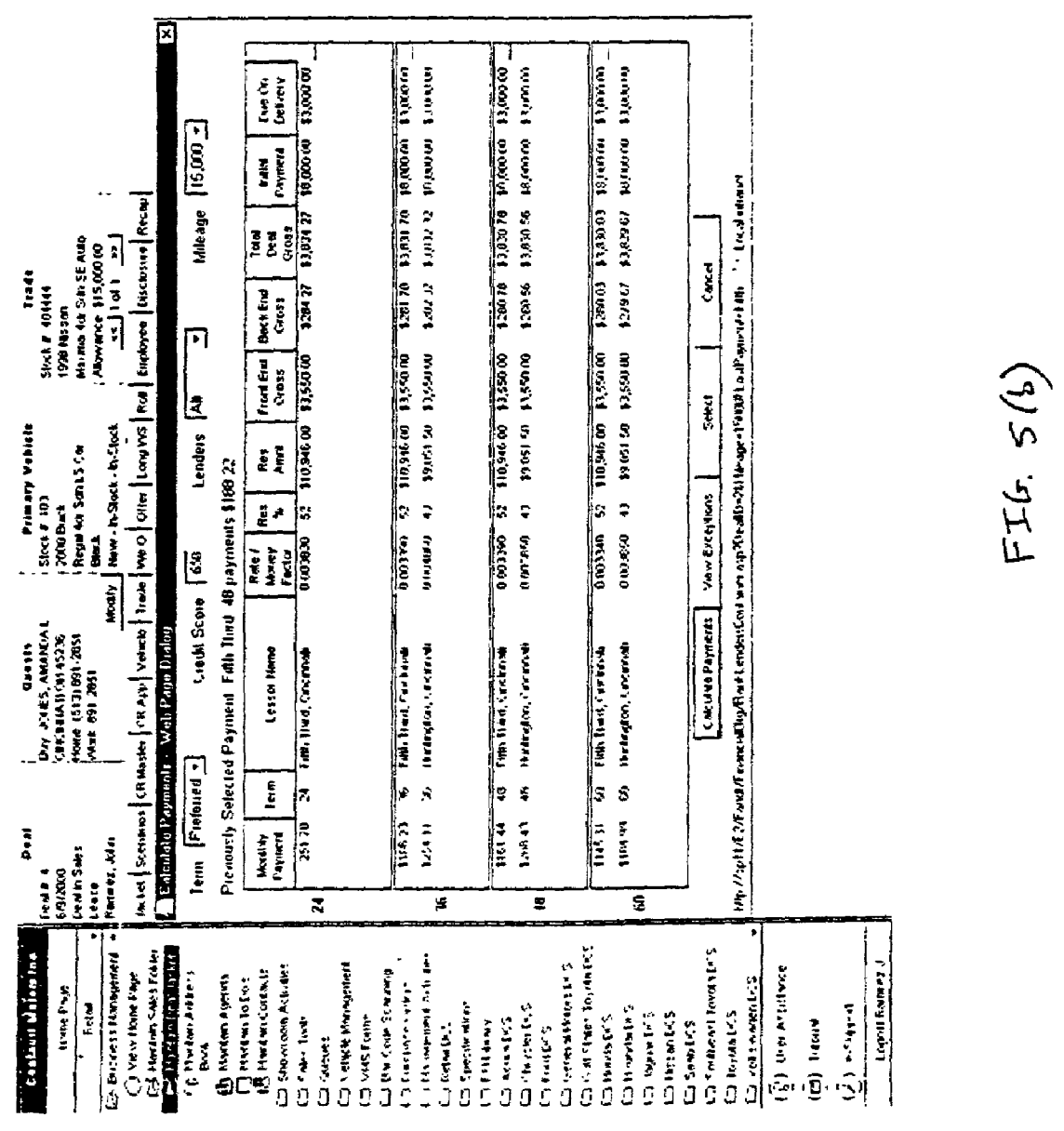
Figure 5C:
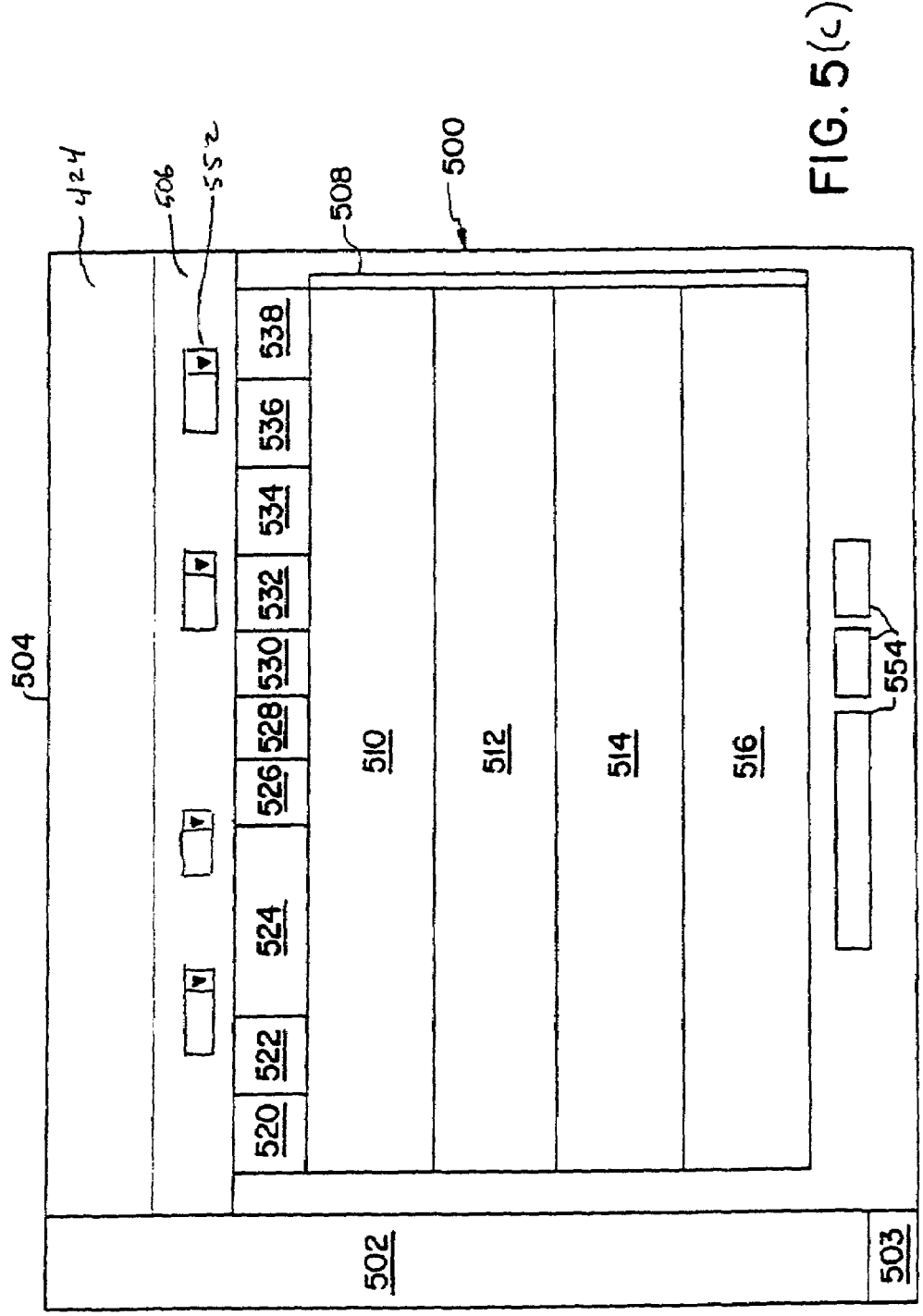
FIG. 5c is a schematic representation of the collected financing or sales information GUI.

To better understand the GUI shown in FIG. 4, illustrative examples are provided. FIGS. 5(*a*), 5(*b*) and 5(*c*) show an example of a GUI 500 which may be displayed at a workstation 145 within a particular dealer store 105. FIG. 5(*a*) shows a screen shot of a GUI 500 displaying sale data while FIG. 5(*b*) shows a screen shot of a GUI 500 displaying lease data. FIG. 5(*c*) shows a schematic diagram of generally showing the elements of the GUIs of FIGS. 5(*a*) and 5(*b*). The GUI 500 shown is designed to provide a sales manager or F&I manager at the store 105 with complete leasing and/or retail information for a given vehicle. On the left-hand side of the GUI 500 is a branding region 404. Further, there is a task bar 412 which has a plurality of folders which represent various applications or sub-applications which are available from the displayed page. Below this area is provided a user assistance region 432 including a Log Off button 503 which exits the application, and may disconnect the workstation from the network. In this Figure, the right hand side is not that shown in FIG. 4 because there is a pop-up screen shown superimposed over a portion of the GUI of FIG. 4. The right hand side includes a content window 504 which includes the variable information input area 506 and the display area 508. As can be seen from FIG. 5(a) a portion of the context area 424 remains visible behind the pop-up screen. The display area 508 for this particular application is preferably divided into several portions. Four horizontal rows 510, 512, 514, 516 represent example lease terms of 24, 36, 48 and 60 months respectively, though each can preferably be defined by the user. The rows preferably display up to five financial institutions defined by the end user, though ability to display more terms may be provided where desirable. Columns 520, 522, 524, 526, 528, 530, 532, 534, 536, 538 represent monthly payment, term, lessor name or lender name, money factor or selling rate, annual percentage rate, residual percentage, residual amount, front end gross, back end gross, total deal gross, initial payment or due on delivery. The exact order may vary and the selected columns depend on whether a sale or a lease is being displayed. Input mechanisms may include pull down menus 552 as well as fill-in-the-blank inputs or radio buttons, depending on the underlying application. This provides the F&I manager with a quick view of the available options and allows him or her to determine quickly which lease option best meets the customer's and the dealership's needs. At the bottom of the page, an additional input area 554 is provided. In the example, this area includes action buttons which include commands to begin a calculation, or to select a desired result.

Figure 6A:
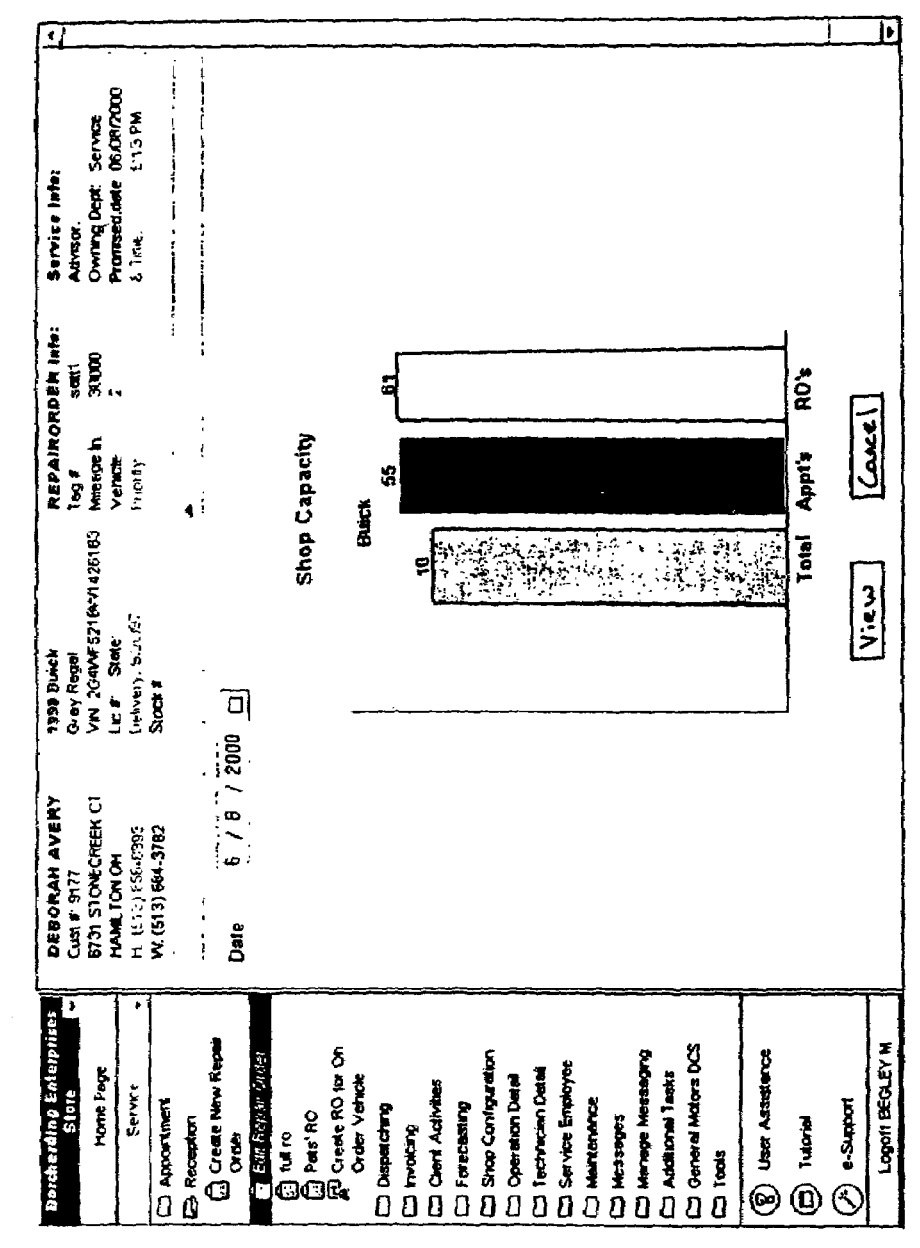

A second example of an application which may be provided is shown in FIGS. 6(a), 6(b) and 6(c). In this application, the service department is able to analyze its productivity, to determine what new appointments may be made, and also to monitor progress of a given job.

As shown in FIGS. 6(a) and 6(b), for a shop which is not employing a separate dispatching application, basic service information can be provided in a concise and clear manner. On the left hand side, a task bar 502 and a user assistance region 503 including a Log Off button are provided. In the upper left corner, a branding region 570 and a user identification along with a default page 574 are displayed. Across the top of the page is the context region 572 which in this example includes information on the vehicle being repaired, the owner and general service information. The content region 574 is provided which in this example includes information on the total shop capacity (the number of vehicles that can be serviced), the number of appointments already taken, and the number of repair orders written. It may also display information on the job to be performed, the shop availability and the amount of estimated time to perform the job. Pre-sold capacity may include all hours not available for sale, because they have been allocated for an appointment, because they have elapsed, even if unused, hold-over hours (hours remaining in a job not completed the previous day) and pre-assigned hours. Preferably, the shop capacity content region 574 would have the ability to display a current day view as well as a weekly view. At the bottom of the page, the action buttons 576 are provided. The action buttons 576, in this example, preferably include VIEW and CANCEL buttons and may include others which allow the operator to navigate through related pages, and an indicator as to the current location 578.

As shown in FIG. 6(c), the content region 416 as employed in a shop which uses the dispatching application may include a pop-up window which gives more detailed information on shop capacity. For a given category of activity, the estimated time, total time available, pre-sold time, unsold time, sold jobs and remaining hours to complete sold jobs is preferably displayed. As time passes, the total time available and unsold hours are preferably reduced, regardless of whether jobs have been sold or not. In addition, as jobs are sold, the unsold hours are reduced. As is evident from FIG. 6(c), total time may be different for different activities. For example, the shop may have 43.72 hours available for work on a particular make of car and only 10.72 hours available for the same make of van, due to personnel or equipment availability.

For categories of activity having unsold capacity, the remaining capacity can be shown. For those categories which have no capacity remaining "Closed" may appear to indicate that the category is fill. When a category is oversold, a negative number can be used to indicate the oversell.

In some cases, it will be desirable to only sell a percentage of the available time in a particular category, to allow for emergencies, difficult jobs or the like. In this case, available time will be represented as capacity times a "sell-to" percentage. The sell-to percentage may vary depending on the category.

The system also preferably includes hand held service mobile units, not shown. These units may be used, for example, in scanning VIN numbers from vehicles which are brought in for service and preferably include a laser scanner for this purpose. The mobile unit interfaces with the data bases so that when a vehicle is brought in and scanned, the mobile unit operator may get information such as most recent service date, whether time or mileage based service is due and whether a manufacturer ordered recall is in effect for the vehicle. The mobile unit preferably includes means to pass information to the central database so that the vehicle is entered into the system after it is scanned. Additionally, the mobile unit preferably has the ability to scan a car owner's driver's license so that the owner information may be entered into the database easily or for other applications.

An instant messaging subsystem is preferably included. Preferably, the instant messaging function retains the basic layout of the GUI as discussed above, at FIG. 4, including the task bar, branding region, user assistance region and content region. In the content region, pull-down menus may be provided for selecting options such as recipient, department, time before expiration (for an instant message that need not be kept for a long period), and priority. The user types a subject and message into text areas and simply sends or cancels the message by clicking on the appropriate button, as desired.

The messaging system preferably includes a view message dialog box which is displayed when View Messages is selected in the task bar. The view messages dialog box displays message header information such as who sent the message, to whom it was sent, time and date, type and priority of the message. Options to delete, reply to or close the message are provided in the dialog box.

Similarly, a reply message dialog box is preferably included allowing replies to be composed and sent.

An alert message system may also be included. The alert message system provides for situations which require immediate attention, such as a missed deadline, arrival of needed parts, job completion and the like. This system preferably has the ability to send a message to a list of employees who receive the message either simultaneously or in a priority order. In the latter case, if an employee cannot respond immediately (or within a predetermined time) to the message, it is sent to the next person on the list for their attention. Such messages may also be assigned an expiration time, so that if nobody replies within the expiration time, the message will be cancelled. This last option may also be used to trigger an automatic e-mail message directly to a customer, informing him or her that a job is done in the case that no employee is available to contact the customer.

An opportunity message screen may be included to communicate additional selling opportunities. For example, a message could be created and distributed which informs employees that a particular customer is interested in replacing a vehicle so that if a particular make and model vehicle comes in for service, the sales department can be notified.

A customer message screen may include the ability to compose a message to a particular user or group to inform that user or group of an opportunity to provide improved service to a customer. For example, if a customer is in need of assistance, a message may be sent which informs a leasing officer that that customer would like more information about leasing options.

Defined messages may be used to send messages which are used often and do not require significant customization. Defined messages may include any of the above types of messages such as customer messages, alert messages and opportunity messages. The pre-defined messages are then sent when a triggering event occurs (such as: a repair order is running late, a customer indicates interest in a new car purchase, or a customer has indicated low satisfaction) simply by double-clicking on the message to be sent.

As a vehicle is accepted into the service area, a vehicle inspection report may be filled out. Conventionally, such inspection reports are documents on paper forms which are filled out by hand as the inspector walks around the vehicle, looking for obvious damage to the paint or the body.

In the present invention, the inspector preferably has a hand held computer, or a desk-top terminal, loaded with the vehicle inspection document software. In the present invention, the inspector accesses a vehicle inspection GUI, and selects the appropriate vehicle picture (van, truck, car), which is then displayed on the screen. By selecting a particular area of the picture (e.g. front quarter-panel, rear bumper), a pull-down menu of possible damages is activated. The appropriate damage is selected and the information is saved in the computer memory. For example, the inspector could click on the windscreen, providing a menu including, chip, crack, missing, etc. This information will then be entered into a digital form which preferably will be linked to or stored with the repair order, and be printable and include all of the inspection results. This allows the dealership to have a record of damage already present prior to work, reducing the possibility of fraudulent or mistaken claims by a customer that the dealer caused the damage. Optionally, a message can be generated and sent to the body shop when damage such as body metal or body paint damage is recorded, providing an up-selling opportunity to that unit.

The system may include a process configurator. The process configurator allows for customization of processes without straying too far from the original defined process.

A process is a particular business function such as writing up a new customer, admitting a vehicle for service, or the like. A process is made up of sub-processes or steps. Each step is a discrete task in the process, such as vehicle damage inspection during a service order write-up. A process template is a complete definition of a process including several steps. The template may include steps which some dealers use and others do not so that dealerships may choose to perform a part or all of the steps in the order presented or in another order.

The configurator helps to configure each process for a particular dealership. Each dealership may decide to configure a process differently for different employees, or may configure processes by employee job category or role, so that each service associate, for example, would follow the same process.

For each process, the system provides a process template as well as a default process. A user accesses the process template and selects which of the sub-processes or steps are to be implemented and in what order they should be performed.

Preferably, users can be grouped into categories (e.g. by job category).

The embodiments as illustrated and discussed in this specification are intended only to teach those skilled in the art the best way known by the inventor to make and use the invention. Nothing in the specification should be considered as limiting the scope of the present invention. Many changes could be made by those skilled in the art to produce equivalent systems and methods without departing from the invention. The present invention should be limited only by the following claims and their legal equivalents.

What is claimed is:

1. A programmable apparatus to generate a graphical user interface, the graphical user interface comprising:
    a branding region, wherein the branding region displays indicia selected from the group consisting of: automobile manufacturer names, automobile dealership names, automobile service provider names and combinations thereof;
    a context region, wherein the context region displays information selected from the group consisting of: customer identifying information, automobile identifying information, automobile service order information, and combinations thereof;
    a task bar;
    a content region, wherein the content region displays information relating to functions selected from the group consisting of: sales, finance and insurance, accounting, human resources, payroll, parts, service, customer database, vehicle database, activities and processes, roles, users and departments, security, reports, printing, instant messaging, e-business enablers, supply chain integration, electronic time clock, system configurator, vehicle inspection, Internet service scheduling, electronic mail service reminders, intra-dealer parts inventory, inter-dealer parts inventory, intra-dealer vehicle inventory, inter-dealer vehicle inventory, dealer communication system and combinations thereof, and
    wherein the content region further displays data selected from the group consisting of: customer data, vehicle data, shop productivity data, loan data, billing system data, employee data, sales data, inventory data, ordering data, and combinations thereof;
    a user identification portion;
    a list button region;
    a user assistance region;
    relationship buttons; and
    action buttons, wherein, for a plurality of disparate applications, a location and size of each of the regions, buttons, task bar and portion remain substantially constant, despite changes in content displayed in each region.

2. A programmable apparatus to generate a graphical user interface, the graphical user interface comprising:
a branding region;
a task bar;
a content region, wherein the content region comprises information pertaining to an automobile repair order, wherein the information pertaining to an automobile repair order is selected from the group consisting of: contact person for the automobile, contact information for the contact person, priority of the service, date of promised completion of the repair, time of promised completion of the repair, total shop capacity, allocated shop capacity, available shop capacity, and time to complete the ordered repair;
a context region;
a user identification portion;
a list button region;
a user assistance region;
relationship buttons; and
action buttons,
wherein, for a plurality of disparate applications, a location and size of each of the regions, buttons, task bar and portion remain substantially constant, despite changes in content displayed in each region.

3. A method of generating a graphical user interface in a display device, comprising:
generating a branding region comprising a portion of a graphical user interface displayed on a display device;
displaying within the branding region indicia selected from the group consisting of: automobile manufacturer names, automobile dealership names, automobile service provider names and combinations thereof;
generating a context region comprising a portion of the graphical user interface;
displaying within the context region information selected from the group consisting of: customer identifying information, automobile identifying information, automobile service order information, and combinations thereof;
generating a task bar comprising a portion of the graphical user interface;
generating a content region comprising a portion of the graphical user interface;
displaying within the content region information relating to functions selected from the group consisting of: sales, finance and insurance, accounting, human resources, payroll, parts, service, customer database, vehicle database, activities and processes, roles, users and departments, security, reports, printing, instant messaging, e-business enablers, supply chain integration, electronic time clock, system configurator, vehicle inspection, Internet service scheduling, electronic mail service reminders, intra-dealer parts inventory, inter-dealer parts inventory, intra-dealer vehicle inventory, inter-dealer vehicle inventory, dealer communication system and combinations thereof;
displaying within the content region data selected from the group consisting of: customer data, vehicle data, shop productivity data, loan data, billing system data, employee data, sales data, inventory data, ordering data, and combinations thereof;
generating a user identification portion comprising a portion of the graphical user interface;
generating a list button region comprising a portion of the graphical user interface;
generating a user assistance region comprising a portion of the graphical user interface;
generating relationship buttons comprising a portion of the graphical user interface; and
generating action buttons comprising portions of the graphical user interface,
wherein, for a plurality of disparate applications, a location and size of each of the regions, buttons, task bar and portion remain substantially constant, despite changes in content displayed in each region.

4. A method of generating a graphical user interface in a display device, comprising:
generating a branding region comprising a portion of a graphical user interface displayed on a display device;
generating a task bar comprising a portion of the graphical user interface;
generating a content region comprising a portion of the graphical user interface, wherein the content region further comprises information pertaining to an automobile repair order, wherein the information pertaining to an automobile repair order is selected from the group consisting of: contact person for the automobile, contact information for the contact person, priority of the service, date of promised completion of the repair, time of promised completion of the repair, total shop capacity, allocated shop capacity, available shop capacity, and time to complete the ordered repair;
generating a context region comprising a portion of the graphical user interface;
generating a user identification portion comprising a portion of the graphical user interface;
generating a list button region comprising a portion of the graphical user interface;
generating a user assistance region comprising a portion of the graphical user interface;
generating relationship buttons comprising a portion of the graphical user interface; and
generating action buttons comprising portions of the graphical user interface,
wherein, for a plurality of disparate applications, a location and size of each of the regions, buttons, task bar and portion remain substantially constant, despite changes in content displayed in each region.

5. A machine readable medium containing instructions, which when executed by a computer cause the computer to execute a method comprising:
generating a branding region comprising a portion of a graphical user interface displayed on a display device;
displaying within the branding region indicia selected from the group consisting of: automobile manufacturer names, automobile dealership names, automobile service provider names and combinations thereof;
generating a context region comprising a portion of the graphical user interface;
displaying within the context region information selected from the group consisting of: customer identifying information, automobile identifying information, automobile service order information, and combinations thereof;
generating a task bar comprising a portion of the graphical user interface;
generating a content region comprising a portion of the graphical user interface;
displaying within the content region information relating to functions selected from the group consisting of sales, finance and insurance, accounting, human resources, payroll, parts, service, customer database, vehicle database, activities and processes, roles, users and departments, security, reports, printing, instant messaging, e-business enablers, supply chain integration, electronic time clock, system configurator, vehicle inspection, Internet service scheduling, electronic mail service reminders, intra-dealer parts inventory, inter-dealer parts inventory, intra-dealer vehicle inventory, inter-dealer vehicle inventory, dealer communication system and combinations thereof;

displaying within the content region data selected from the group consisting of: customer data, vehicle data, shop productivity data, loan data, billing system data, employee data, sales data, inventory data, ordering data, and combinations thereof;

generating a user identification portion comprising a portion of the graphical user interface;

generating a list button region comprising a portion of the graphical user interface;

generating a user assistance region comprising a portion of the graphical user interface;

generating relationship buttons comprising a portion of the graphical user interface; and generating action buttons comprising portions of the graphical user interface, wherein, for a plurality of disparate applications, a location and size of each of the regions, buttons, task bar and portion remain substantially constant, despite changes in content displayed in each region.

6. A machine readable medium containing instructions, which when executed by a computer cause the computer to execute a method comprising:

generating a branding region comprising a portion of a graphical user interface displayed on a display device;

generating a task bar comprising a portion of the graphical user interface;

generating a content region comprising a portion of the graphical user interface, wherein the content region further comprises information pertaining to an automobile repair order, wherein the information pertaining to an automobile repair order is selected from the group consisting of: contact person for the automobile, contact information for the contact person, priority of the service, date of promised completion of the repair, time of promised completion of the repair, total shop capacity, allocated shop capacity, available shop capacity, and time to complete the ordered repair;

generating a context region comprising a portion of the graphical user interface;

generating a user identification portion comprising a portion of the graphical user interface;

generating a list button region comprising a portion of the graphical user interface;

generating a user assistance region comprising a portion of the graphical user interface;

generating relationship buttons comprising a portion of the graphical user interface; and generating action buttons comprising portions of the graphical user interface, wherein, for a plurality of disparate applications, a location and size of each of the regions, buttons, task bar and portion remain substantially constant, despite changes in content displayed in each region.

7. A programmable apparatus to display a graphical user interface, the graphical user interface comprising:

a. means to generate a graphical user interface with a plurality of display regions, using a programmable apparatus, b. means to display the plurality of display regions on a display device, c. each display region corresponding to a different automobile lease term;

d. each display region being further divided into sub-regions, the sub-regions displaying information pertaining to available lease programs, the information selected from the group consisting of: lessor identification, money factor, residual percentage, residual amount, back end gross, total deal gross, initial payment, amount due on delivery, the lease term, and the monthly payment.

8. An apparatus as in claim 7, further comprising:

means to accept input requesting a sort of the information displayed;

means to sort the information displayed in response to the input; and means to display the sorted information.

9. A method of displaying a graphical user interface on a display device, comprising:

a. generating a graphical user interface with a plurality of display regions, using a programmable apparatus, b. displaying the plurality of display regions on a display device, c. each display region corresponding to a different automobile lease term;

d. each display region being further divided into sub-regions, the sub-regions displaying information pertaining to available lease programs, the information selected from the group consisting of: lessor identification, money factor, residual percentage, residual amount, back end gross, total deal gross, initial payment, amount due on delivery, the lease term, and the monthly payment.

10. A method as in claim 9, further comprising:

a. accepting input requesting a sort of the information displayed;

b. sorting the information displayed in response to the input; and c. displaying the sorted information.

11. A machine readable medium containing instructions which when executed by a programmable apparatus causes the apparatus to execute a method comprising:

a. generating a graphical interface with a plurality of display regions, using a programmable apparatus, b. displaying the plurality of display regions on a display device, c. each display region corresponding to a different automobile lease term;

d. each display region being further divided into sub-regions, the sub-regions displaying information pertaining to available lease programs, the information selected from the group consisting of: lessor identification, money factor, residual percentage, residual amount, back end gross, total deal gross, initial payment, amount due on delivery, the lease term, and the monthly payment.

12. A machine readable medium as in claim 11, the method further comprising:

a. accepting input requesting a sort of the information displayed;

b. sorting the information displayed in response to the input; and c. displaying the sorted information.

* * * * *